United States Patent [19]

Ladd

[11] Patent Number: 4,747,124
[45] Date of Patent: May 24, 1988

[54] PBX TELEPHONE CALL CONTROL SYSTEM

[75] Inventor: David J. Ladd, Las Gatos, Calif.

[73] Assignee: Opcom, San Jose, Calif.

[21] Appl. No.: 731,171

[22] Filed: May 6, 1985

Related U.S. Application Data

[63] Continuation-in-part of Ser. No. 425,227, Sep. 28, 1982, abandoned.

[51] Int. Cl.⁴ .................... H04M 3/50; H04M 3/58
[52] U.S. Cl. ................................ 379/67; 379/212; 379/214
[58] Field of Search ........... 179/18 BE, 18 BD, 18 B, 179/18 AD, 90 BD, 90 B, 89, 27 FG, 27 FH, 18 EA, 6.08, 6.11, 6.17; 379/211, 212, 89, 88, 67, 213, 214, 84, 233

[56] References Cited

U.S. PATENT DOCUMENTS

| | | | |
|---|---|---|---|
| 3,793,487 | 2/1974 | Kilby | 379/74 |
| 4,122,308 | 10/1978 | Weinberger et al. | 379/131 |
| 4,139,739 | 2/1979 | von Meister et al. | 379/207 |
| 4,327,251 | 4/1982 | Fomenko et al. | 379/76 X |
| 4,371,752 | 2/1983 | Matthews et al. | 379/89 |
| 4,413,158 | 11/1983 | Danford | 379/211 |
| 4,420,656 | 12/1983 | Freeman | 379/73 |
| 4,484,031 | 11/1984 | Gray et al. | 379/212 |
| 4,577,062 | 3/1986 | Hilleary et al. | 379/88 |
| 4,608,640 | 8/1986 | Carter et al. | 379/71 |

FOREIGN PATENT DOCUMENTS

| | | | |
|---|---|---|---|
| 129469 | 10/1981 | Japan | 379/88 |
| 54492 | 3/1982 | Japan | 379/211 |

OTHER PUBLICATIONS

"Unanswered Call Diverter", *IBM Technical Disclosure Bulletin*, vol. 25, No. 7A, Dec. 1982, pp. 3480-3481.

Primary Examiner—Thomas W. Brown
Attorney, Agent, or Firm—Flehr, Hohbach, Test, Albritton & Herbert

[57] ABSTRACT

A PBX telephone call control system is disclosed. The system provides a line interface unit connection between a plurality of subscriber line extensions and a private branch exchange (PBX or Centrex equipped) switching equipment. The call control system appears to the PBX like any other telephone extension within the office environment and provides the user with more features in conjunction with the pre-existing PBX equipment, providing expanded capabilities at a reasonable expense.

13 Claims, 2 Drawing Sheets

FIG.—1 ns via a trunk or trunks to a central office. PBX equipment is, of course, well known in the prior art, as numerous manufacturers are providing many types of PBX equipment for virtually every type of business environment. A Centrex equipped central office operates identically to a PBX except that the equipment is located in the telephone company's central office premises and not the customer's. From here on when referring to PBX, a Centrex equipped central office is also covered.

PBX TELEPHONE CALL CONTROL SYSTEM

BACKGROUND OF THE INVENTION

This application is a continuation-in-part of application Ser. No. 425,227, filed Sept. 28, 1982, now abandoned.

The present invention relates to PBX (private branch exchange or Centrex equipped central office) interface equipment.

A PBX can be defined as a telephone exchange serving a single organization, having a switchboard and associated equipment, usually located on the customer's premises. The PBX equipment provides for switching calls between any two extensions served by the exchange or between any extension and the national telephone system via a trunk or trunks to a central office. PBX equipment is, of course, well known in the prior art, as numerous manufacturers are providing many types of PBX equipment for virtually every type of business environment. A Centrex equipped central office operates identically to a PBX except that the equipment is located in the telephone company's central office premises and not the customer's. From here on when referring to PBX, a Centrex equipped central office is also covered.

Typically, the PBX equipment provides connections between a plurality of telephone subscriber lines (extensions) such as those located in a typical office environment and a plurality of trunk lines, typically smaller in number than the subscriber lines. The PBX equipment provides switching functions which permit subscribers, under certain limitations, in an office environment to gain access as required to trunk lines, including WATS (wide area telephone service), DDD (direct distance dialing) and the like, for enabling connections of telephone calls. The PBX equipment also permits incoming calls on trunk lines to be connected to extensions and extensions to connect to other extensions.

As a user's business expands, it frequently becomes desirable to add more features to pre-existing PBX equipment, and to provide expanded capabilities at a reasonable expense. However, a problem in the prior art is that, in order for an installation to provide additional features for the installed PBX equipment, it has been difficult to upgrade the existing PBX equipment because of limitations of space, memory storage, power limitations and the like.

In addition, the general approach with upgrading existing PBX equipment is by connecting additional switching equipment between the existing PBX and the trunks themselves. A further problem with such an approach is excessive costs which necessarily are involved with installations of more expensive switching equipment to the trunk lines.

It would therefore be desirable to provide a system for providing additional capabilities to existing PBX equipment in an office environment while not excessively increasing the cost of such upgrading of the existing equipment.

In view of the above background, it is an objective of the present invention to provide an improved interface equipment for connection to existing PBX equipment.

SUMMARY OF THE INVENTION

The present invention relates to a PBX telephone call control system for use with PBX type switching equipment.

In one embodiment, the call control system includes a plurality of trunk lines, a plurality of telephone subscriber lines or extensions (such as would be in a typical office environment) and PBX (private branch exchange) or Centrex switching apparatus connected between the subscriber lines and the trunk lines.

The call control system also includes line interface equipment connected to some of the subscriber lines and consequently to the PBX equipment. The line interface unit simulated a group of extensions within the system to the PBX equipment.

Hence, in one mode of operation, the call control system appears to the PBX just like any other telephone extension within the system. In this mode of operation, the system is "called" by a user wishing to use its services, and when the system (and more particularly the line interface unit) detects a ring voltage, it in turn gives an off-hook signal to "answer" the call and returns a dial tone.

The user hears the dial tone and dials the number he wishes. The call control system analyzes the number, requests an authorization code if necessary, selects the most economical route, and "flashes" the PBX to indicate that a call transfer is desired, dials (using a dual tone multifrequency signaling circuit) the trunk access code and the called number, and finally hangs up to complete the transfer of the user to the appropriate trunk.

Among the features provided by this embodiment of the present invention to the user in a PBX environment are:

route optimization, which provides automatic selection of the least cost route for outgoing calls,
call queuing, which provides that, when a least cost route is not available, automatic callback to a user when the route does in fact become available,
toll restriction, which prevents unauthorized calls by requiring the user to enter an authorization code before a call will be placed, and
station message detail recording, which provides information on what numbers were called.

Another feature of the present invention is a "talker" circuit, which provides pre-stored voice messages to automatically indicate to a user whether the most economical route is available or, if not, what other routes are available thereby providing the user with the capability of either completing his call or waiting until a more economical trunk is available.

In another mode of operation, the call control system also appears to the PBX just like any other group of telephone extensions. In this mode, a group of external incoming trunks are directed by the PBX to ring directly to one of the group of PBX extension lines connected to the call control system (and more particularly the line interface unit). Thus when an external (to the PBX) caller calls in on one of these incoming external trunks, the PBX applies ring voltage signal to one of the line interface ports to signal the incoming call. The line interface detects the ring voltage and it in turn gives an off-hook signal to "answer" the call. It then uses the Voice Response Unit—TALKER to play a voice prompt to instruct the external caller to enter (via DTMF signals) an extension number.

The external caller hears the voice prompt and, using the buttons on his telephone, keys-in a series of digits corresponding to an extension number of an internal telephone on the PBX. The call control system decodes the digits as they are received and when enough have been received to determine the extension number, the call control system signals the PBX (via a "flash" plus optional additional DTMF digits), to initiate a transfer of the calling party on the external incoming trunk.

The call control system then signals the extension number to attempt to initiate the transfer. The tone detect circuit on the line card is used to "listen" to the call progress tones and thus determine if the called extension is busy, ringing, or answers. If the called extension is busy or does not answer after a certain number of rings, the call control system signals the PBX (usually by "flashing" and an optional DTMF code sequence) to reconnect to the calling external trunk and plays a voice prompt to inform the caller of the status of the extension and that the caller may then enter another extension to be called, leave a voice message, or enter zero to reach the operator. If the called extension answers, the call control system signals the PBX (usually by a "hang-up") to compete the transfer of the calling party on the external incoming trunk to the called extension.

Among the features provided by this embodiment of the present invention to the user in a PBX environment are:
  direct access to internal extensions on the PBX from external callers without operator intervention,
  voice prompting messages on the status of the called extension,
  interface to a voice message switching system to leave a recorded message for the called extension,
  the ability to call additional internal extensions when a previous attempt results in a busy or no answer, or after leaving a recorded voice message.

In accordance with the foregoing summaries, the present invention achieves the objective of providing an improved PBX telephone call control system for use in a PBX environment.

Other objects and features of the present invention will become apparent from the following detailed description when taken in conjunction with the accompanying drawings.

DETAILED DESCRIPTION OF THE DRAWINGS

Figure 1:
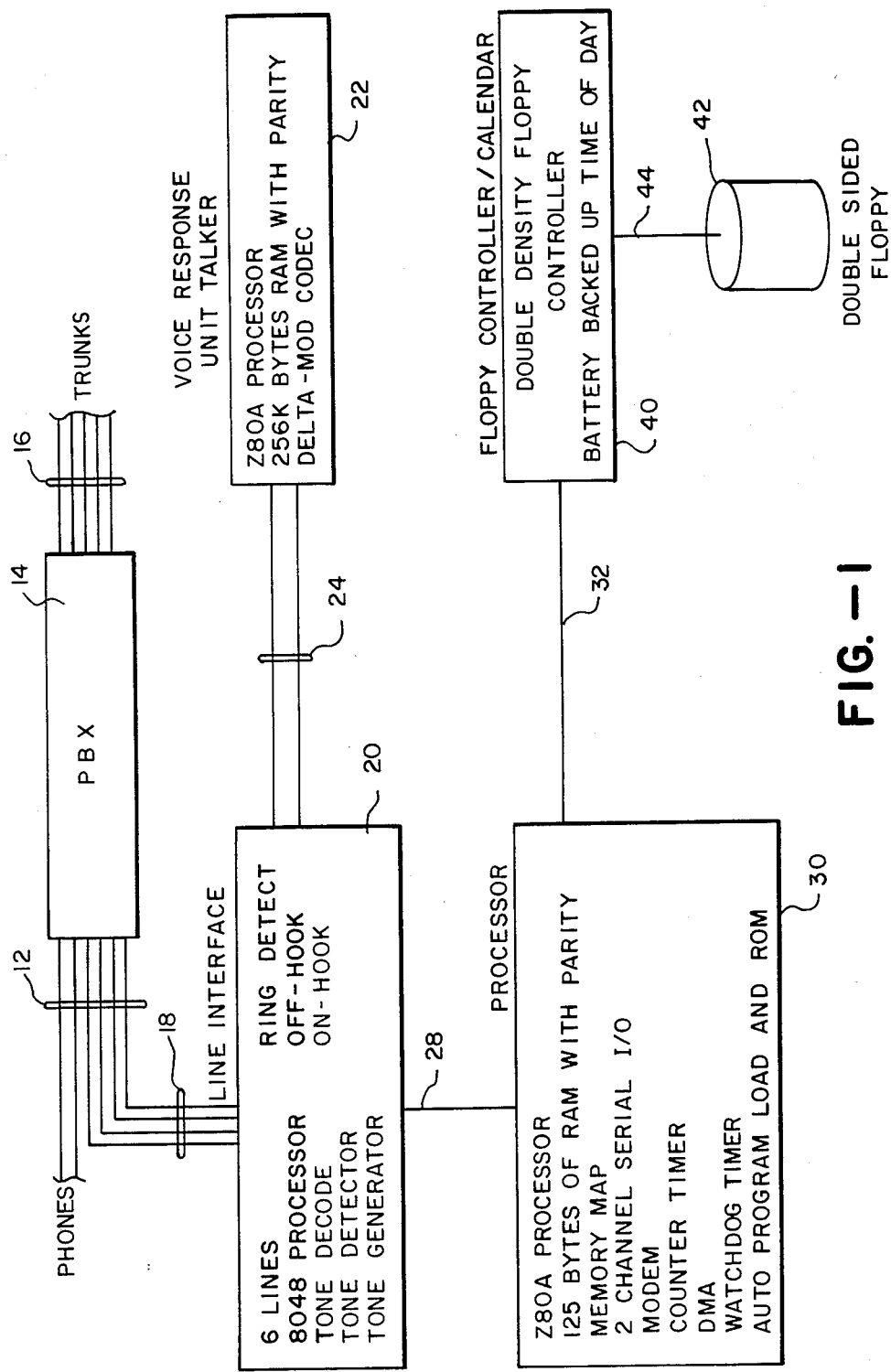
FIG. 1 depicts a block diagram of a PBX telephone call control system according to the present invention.

FIG. 1 depicts a block diagram illustrating the PBX telephone call control system as connected to the PBX (private branch exchange) interface. Before going into more detail concerning the drawings, a general system specification of two embodiments of the present invention will be described in some detail.

In the first embodiment, a user dials an access code for the system. Usually the access code will be the pilot number of a "hunt" group (an extension which, when dialed, will in turn cause to ring the first non-busy extension in a group of extensions). The user may hear a brief period of ringback tone before the system answers.

When the system answers, the user will be given dial tone by the call control system.

The user than "dials" the feature desired. DIALTONE is removed after the first digit.

By looking at the digits dialed and its data bases, the system will then collect the necessary number of digits to complete the feature. In some special cases, such as international dialing, the system does not know how many digits to collect, and will wait until the user does not enter any more digits for an "interdigit timeout" (usually configured to be five seconds).

If the user dialed an illegal sequence of digits, the system will respond with the message "INVALID NUMBER, DIAL NUMBER" and the user will be given initial system DIALTONE.

If the user dialed any digit 0-9, the system enters the destination or external call function. If the system times out while waiting for the first destination digit, the system will respond with the message "ENTER NUMBER." If the user still does not respond before another timeout, the system will respond with the message "DIALED TOO SLOW" and then disconnect from the user. If the user starts entering his destination number and times out between digits, the system (with the following exception) will respond with the message "DIALED TOO SLOW" and then disconnect from the user. The exception is when the user has dialed an international number (starting with 01), a timeout will signal the system that all necessary digits have been entered. This is required because there is not a fixed length numbering plan for international dialing.

The digits *NNN (N is a digit 0-9) is the system speednumber feature. The number of N's is configurable from 1 to 3 depending on the number of speednumbers configured for the system.

Toll restriction is used to prevent certain people from dialing expensive calls. It is also used to allow people to dial certain numbers without identifying themselves.

If certain numbers are desired to be dialed by anyone and no identification of the caller is desired, these numbers should be listed in the "Exempt" table. These calls will be exempt from having the user be asked for his account code. The system default Class of Service (COS) will be used for these calls. Exempt numbers may be three or six digits long. They are area codes, area code + office codes, or office codes. If complete seven or ten digit numbers are to be exempt, the speednumber feature should be used for these numbers. If a specific office code for any area code, such as 555, is to be exempt, a special flag may be used preceding the 555 to flag a match on any area code.

If certain numbers are to be blocked from being dialed by everyone, these numbers should be listed in the "Blocked" table. Typical numbers may include, for example, Time. Blocked numbers can be up to ten digits long. If the number dialed is "blocked" the system responds with the message "RESTRICTED NUMBER DIALED" and then disconnects from the user.

If the number dialed was not Exempt or Blocked or a speed-number from which a COS could be found, the user will be asked to enter an Account code.

Account codes are used to determine the COS and extension number of the user. If the number dialed requires an account code to be entered, the system will respond with the message "ENTER ACCOUNT CODE." The user then enters the account code. If it is invalid, the system will respond with the message "INVALID ACCOUNT CODE, ENTER ACCOUNT CODE." The user is allowed three tries, after which the system will respond with the message "INVALID ACCOUNT CODE" and then disconnect from the user.

Route Optimization is used for both selecting the best route to use to place the call, and to provide toll restriction based on the COS of the user. Time of day or day of week changes are applied to the user's COS prior to continuing with route optimization.

If the call is a 0 or 0 + digits call, the system parameter table is checked to see if the user has the minimum COS necessary to place this type of call. If so, the call is routed over the system default route, which is DDD. If the user does not have a high enough COS, the system will respond with the message "RESTRICTED NUMBER DIALED" and then disconnect from the user.

The system then searches the routing tables for the number dialed. When it finds a match, it then has a list of choices for route to use for the specific call. If no match is found, the system default list (which is DDD only) is used. A route describes a specific trunk group and information about the digits (strip Area Code ...) to be outpulsed.

If the first choice route cannot be used due to COS restrictions, the system will "Route and Advance" to the next choice route. If the COS of the user does not allow access to any route on the list, the system will respond with the message "RESTRICTED NUMBER DIALED" and then disconnect from the user. This is the usual method of toll restriction.

The system starts with the first choice route. If the user COS allows him access, and the route is known to be idle, the system flashes, dials the trunk access code, waits for external dial tone, outpulses the destination digits, and completes the transfer by hanging up.

If the first choice route cannot be used because it is busy, the system check COS information to see if the user is required to queue on this route before advancing to the next route. If not, the next route is tried as described above. This continues all the way down the list of routes until an idle trunk is found.

Whenever the system is about to try the DDD route and there were cheaper but busy routes which the user could queue for but his high COS caused him not be asked to wait, the system will respond with the message "CALL IS BEING PLACED ON AN EXPENSIVE ROUTE, PRESS STAR TO PROCEED, ENTER EXTENSION NUMBER TO CALLBACK QUEUE." There is a flag by COS telling if this question should be asked. If the user keys a #, the call is cancelled and the user is dropped to system dialtone.

If the user because of COS can use a route, his COS also allows him to callback queue for the route. A different flag by COS tells if the user can offhook queue for the route. If the user is required to queue for the first choice route, his COS is also checked to see if he can offhook queue for this route. If he can offhook queue, the system responds with the message "ALL ROUTES BUSY, XX CURRENTLY WAITING, PRESS STAR FOR OFFHOOK QUEUE, ENTER EXTENSION NUMBER FOR CALLBACK QUEUE." If he is not allowed to offhook queue, the system responds with the message, "ALL ROUTES BUSY, XX CURRENTLY WAITING, ENTER EXTENSION NUMBER FOR CALLBACK QUEUE." XX is the smallest number of people waiting for any of the routes he could queue on.

After the user enters his extension number, the system gives no confirmation, but just disconnects from the user. If the user enters a star, he goes into an offhook queue state, but also gets no confirmation. While a user is offhook queued, he will normally hear silence, and sometime "clicks" when he is put on hold to try for the trunk. If the user does nothing for a "first digit timeout" period (usually ten seconds), the system will assume he is not interested in queuing and will give the timeout message "PLEASE DIAL" with another three seconds, and if no response, disconnects from the user. Entering a "#" prior to system disconnect will cause the system to drop the user back to system DIALTONE. While waiting offhook, if the call is placed on a cheap route, no message is given to the user.

There is also a configurable limit to the number of ports to be used for offhook trunk queuing. If this limit is reached, the user will be asked if he wishes to callback (onhook) queue only.

Whenever the system is about to try the DDD route and there were cheaper but busy routes which the user could queue for but his high COS caused him not be asked to wait, the system will respond with the message "CALL IS BEING PLACED ON AN EXPENSIVE ROUTE. PRESS STAR TO PROCEED, ENTER EXTENSION NUMBER TO CALLBACK QUEUE." There is a flag by COS telling if this question should be asked. Asking this question to an offhook queued person will force him to go to onhook queue if he wants to continue to wait. If he chooses to wait on-hook for the cheap route, he will wait there with no timeout until one of the cheaper routes becomes available. When a trunk becomes available for a queued call, or the user is route advanced to a route which has an available trunk, the system will call back the user at the extension number he has entered.

If the user does not answer, after ten minutes the system will try to call the user again when the trunk queued for is free. This retry is done only once, after which the queue is cancelled.

If the user presses "*", the call is placed. If the user presses "#", he requeues and will not be called back for ten minutes. This is used if he is occupied. If the user does nothing, or hangs up, the queue is cancelled and the system disconnects from the user.

If the call is going out over DDD, the system responds with the message "CALL TO XXX XXX XXXX IS BEING PLACED ON AN EXPENSIVE ROUTE, PRESS STAR TO PROCEED, PRESS POUND TO WAIT FOR A LOW COST ROUTE."

If the user presses in a "*", the call is made. If the user presses in a "#", the call is requeued on the more epxensive routes with no timeout. Thus the system will wait forever, or until a cheap route becomes available.

Illustrative examples of the types of talker messages which can be generated are set forth below:
1. DIAL NUMBER
2. INVALID NUMBER, DIAL NUMBER
3. INVALID FUNCTION
4. INVALID SPEEDNUMBER, DIAL SPEEDNUMBER
5. ENTER ACCOUNT CODE
6. INVALID ACCOUNT CODE, ENTER ACCOUNT CODE
7. INVALID ACCOUNT CODE
8. RESTRICTED NUMBER DIALED
9. ALL ROUTES BUSY 10. ALL ROUTES BUSY, XX CURRENTLY WAITING, PRESS STAR FOR OFFHOOK QUEUE, ENTER EXTENSION NUMBER FOR CALLBACK QUEUE
11. ALL ROUTES BUSY, XX CURRENTLY WAITING, ENTER EXTENSION NUMBER FOR CALLBACK QUEUE
12. CALL IS BEING PLACED ON AN EXPENSIVE ROUTE, PRESS STAR TO PROCEED, ENTER EXTENSION NUMBER FOR CALLBACK QUEUE
13. CALL IS BEING PLACED ON MCI, PRESS POUND TO BYPASS
14. CALL IS BEING PLACED ON SPRINT, PRESS POUND TO BYPASS
15. CALL TO XXX XXX XXXX CAN BE PLACED, PRESS STAR TO PROCEED, PRESS POUND TO REQUEUE
16. CALL TO XXX XXX XXXX IS BEING PLACED ON MCI, PRESS STAR TO PROCEED, PRESS POUND TO BYPASS
17. CALL TO XXX XXX XXXX IS BEING PLACED ON SPRINT, PRESS STAR TO PROCEED, PRESS POUND TO BYPASS
18. CALL TO XXX XXX XXXX IS BEING PLACED ON AN EXPENSIVE ROUTE, PRESS STAR TO PROCEED, PRESS POUND TO WAIT FOR A LOW COST ROUTE
19. DIALED TOO SLOW
20. ALL ROUTE BUSY, XX CURRENTLY WAITING, PRESS STAR FOR OFFHOOK QUEUE
21. CALL IS BEING PLACED ON AN EXPENSIVE ROUTE, PRESS STAR TO PROCEED In the second embodiment of the present invention, an external caller located outside the PBX dials the phone number that corresponds to the Direct Distance Dialing number of a group of incoming external trunks to the PBX. The PBX is set up to detect when one of these trunks rings in and directs the trunk to ring one of the group of subscriber lines which is connected to the call control system.

When the call control system detects the ring, it goes "off-hook" to answer the call and plays a voice prompt such as "GOOD MORNING, PLEASE DIAL THE EXTENSION YOU WISH TO REACH, OR HOLD ON THE LINE FOR ASSISTANCE." The caller may key in a digit while the prompt is being played, in which case the prompt will be stopped. After the prompt is played, if no digit is received for five seconds, the calling external trunk will be transferred to a fixed number (usually the operator).

By looking at the digits keyed in and its data bases, the system will then collect the necessary number of digits for an extension number on the PBX. (The first digit of the extension number determines how many digits there will be in total.)

If the user dials an illegal sequence of digits, say 88, the system will respond with the message "EXTENSION 88 DOES NOT EXIST, PLEASE DIAL ANOTHER EXTENSION NUMBER OR DIAL 0 FOR ASSISTANCE."

Once the call control system has all the digits which correspond to a legal extension number, it will signal a "flash" to the PBX to initiate a transfer sequence (which may require additional digits to be dialed before the extension number such as *7), wait for dial tone to be returned from the PBX and output the extension digits (in DTMF) to the PBX.

After all the extension number digits have been sent, the system will "listen" to the call progress tones, and using data bases set up for the tone patterns of the particular PBX, determine if the called extension is busy, ringing or answered. For example, a busy signal would be a tone cadence of 500 milliseconds on, 500 milliseconds off, 500 milliseconds on, etc. A ring back signal might be one second on, three seconds off, one second on, etc. Answer is determined as more than three seconds of silence, more than one second of tone on, or tone shorter than 500 milliseconds.

If the called extension answers, the system completes the transfer (usually by just hanging up) of the external trunk to the called extension.

If the extension is busy or does not answer in a certain number of ring periods, the system will signal the PBX (usually via a "flash" and in some cases a special code such as *1) to reconnect to the calling external trunk.

It will play a voice prompt which says "EXTENSION XXX DOES NOT ANSWER [or IS BUSY], LEAVE A MESSAGE AT THE TONE, DIAL ANOTHER EXTENSION NUMBER, OR DIAL ZERO FOR ASSISTANCE." It will wait three seconds for the caller to enter a digit, and if none is entered it will play a voice prompt which says "RECORDING (BEEP)." The system will have signaled to the voice message system the extension number to record the voice message for. If the caller did enter another digit, the system will analyze it and process as before (call another extension or transfer to the operator).

While recording a voice message, if the user is silent for eight seconds, the call control system will disconnect from recording and play a prompt which says "DIAL ANOTHER EXTENSION NUMBER OR DIAL ZERO FOR ASSISTANCE."

While recording, if the call control system detects a valid DTMF digit, it will disconnect from the recording and collect any additional digits corresponding to another extension to be called.

Now that a general overview has been described, a specified example of the system's operation will be given in conjunction with a typical telephone call placed by a user. The specific example will be described with reference to FIGS. 1 and 2.

Referring now to FIG. 1, PBX 14 is connected to a plurality of trunk lines 16 and, in addition, to a plurality of conventional subscriber lines (or extensions) 12.

As previously described, PBX 14 provides for switching calls between any two extensions served by the exchange or between any extensions in the national telephone system via a trunk or trunks 16 to a central office (not shown). PBX 14 could be of any type well known in the art.

Subscriber lines are connected to PBX 14 in the normal fashion. In addition, the system depicted in FIG. 1 shows a line interface unit 20 connected to subscriber lines 12 via bus 18. In a preferred embodiment, six lines are connected from line interface unit 20 to subscriber lines 12 via bus 18.

Line interface unit 20 is depicted in more detail in FIG. 2 and will be described in some detail below.

Referring again to FIG. 1, line interface unit 20 is connected to a talker circuit 22 via bus 24. Talker circuit 22 includes a Z80A microprocessor and includes up to 256K bytes of random access memory (RAM), with parity, and in addition a delta-mod codec. Talker circuit 22, as has been described above, provides a user with verbal instructions.

FIG. 1 also includes a main processor 30, which provides the system with general supervision of line interface unit 20. Processor 30 typically includes a Z80A microprocessor with RAM memory and other components illustrated for providing the necessary supervisory functions required.

Additional storage capability is provided to the system through a floppy controller/calendar circuit 40, which is connected to main processor 30 via bus 32. The floppy controller circuit 40 is in turn connected to a conventional floppy storage device 42 through bus 44. Referring now to FIG. 2, a more detailed diagram of the line interface unit 20 of FIG. 1 is depicted.

Figure 2:
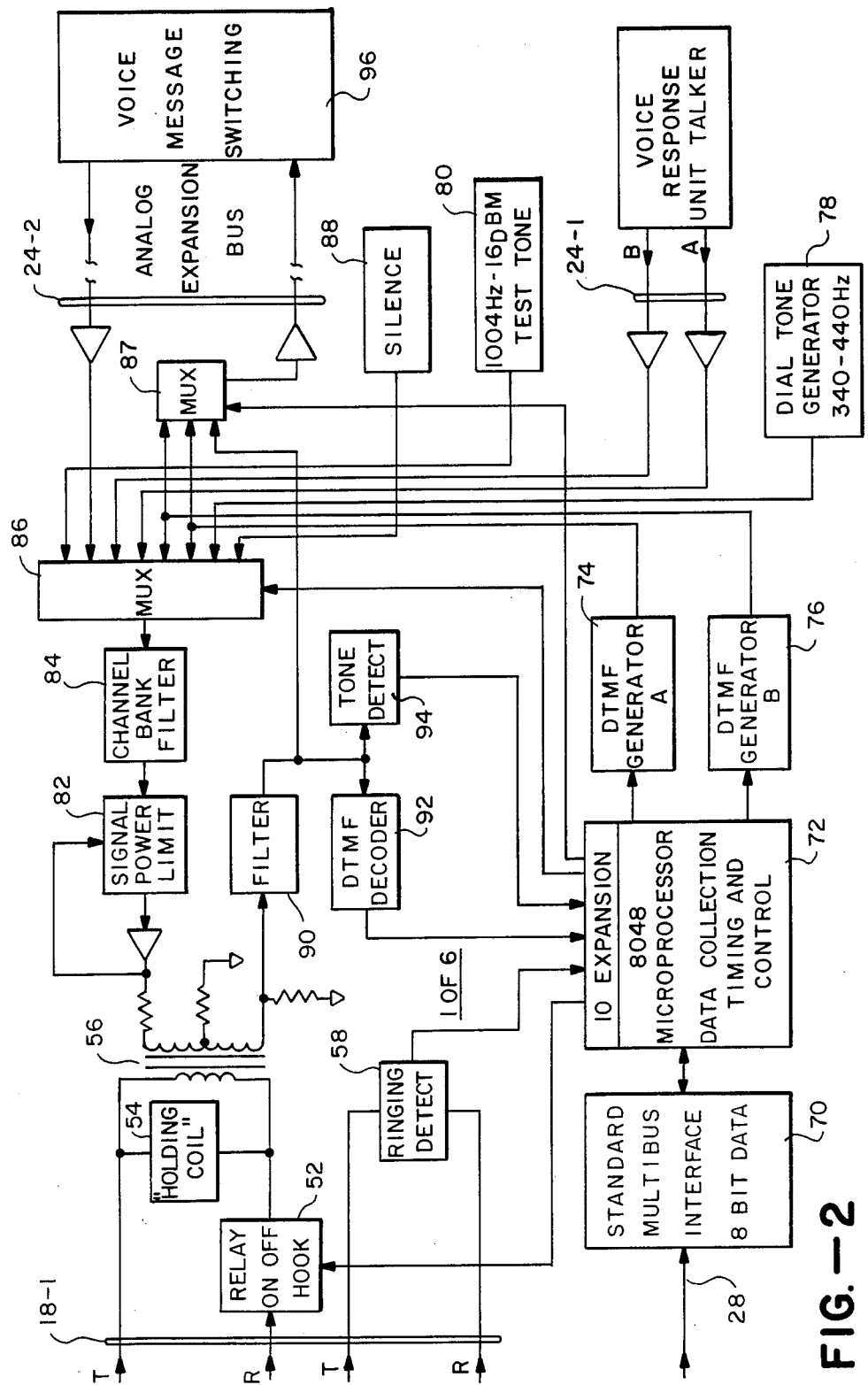
FIG. 2 depicts a block diagram of a PBX telephone call control system according to the present invention.

In FIG. 2, line interface unit 20 is shown with only one of the six lines 18 (specifically line 18-1) which is connected to conventional subscriber lines (or tip-ring lines) 12 of FIG. 1.

In FIG. 2, the connections could be to two- or four-wire tip-ring pairs, as required by particular system necessities.

The relay off-hook circuit 52 is connected to the tip-ring pair 18 which, together with holding coil circuit 54 and transformer 56, provide the necessary coupling for "connecting" line interface unit 20 to the particular subscriber line.

Line interface unit 20 of FIG. 2 also includes a ring detect circuit 58, DTMF (dual tone multifrequency) decoder circuit 92 and dial tone detect circuit 94, all of which are connected to microprocessor 72, which is typically an 8048 microprocessor. Tone detect circuit 94 is a power detect circuit which will detect a signal in the frequency range of 300 Hz to 3000 Hz with a power level greater than −30 dB. It is used not only to detect dial tone, but ringback tone, busy tone or talking.

Microprocessor 72 in FIG. 2 is also connected to dual tone multifrequency generator circuits 74, 76 which are in turn connected to conventional multiplexer circuit 86.

Dial tone generator circuit 78 is also connected to multiplexer 86, together with test tone circuit 80 and silence circuit 88.

The output of line interface unit 20 via bus 24 is to talker circuit 22 with the output identified as bus 24-2 and the input bus identified as 24-1, as depicted in FIG. 2.

Multiplexer circuit 86 is controlled by microprocessor 72 and provides suitable multiplexing of desired signals through channel bank filter 84 and signal power limit circuit 82 for transformer coupling through transformer 56 to tip-ring pair 18.

In addition, microprocessor 72 is connected to a main processor via bus 28, via standard multibus interface 70, which is typically an 8-bit data bus.

Filter circuit 90 provides filtering for noise typically present in a subscriber environment. The signal power limit circuit 82 and channel bank filter 84 are also provided for required filtering of the system.

In order to illustrate in more detail one aspect of the present invention, a typical call sequence will be described in conjunction with the system depicted in FIGS. 1 and 2.

First assume an extension within the user environment desires to call another extension within the same complex via telephone subscriber lines 12.

Assume further that the second extension is a line connected to the present invention instead of another typical extension within the system.

The PBX 14 of FIG. 1 would then apply ring voltage to line interface unit 20. Ring detect circuit 58 of FIG. 2 would detect the ring voltage. Microprocessor 72 scans ring detect circuit 58, and after detecting the ring detect signal (for typically two samples), microprocessor 72 sends a code to main processor 30 of FIG. 1, telling processor 30 that the channel is being rung.

Main processor 30 sends a command to microprocessor 72 of FIG. 2 through bus 28 telling microprocessor 72 to activate off-hook relay 52.

Microprocessor 72, in response to this command, activates relay circuit 52, thereby answering the "call".

Main processor 30 sends a command to microprocessor 72, telling it to connect dial tone through generator circuit 78. Microprocessor 72 connects dial tone generator 78 to line 18-1.

The extension has now received the dial tone and now begins to "dial" the desired number. With a pushbutton type telephone subscriber set, dual tone multifrequency tones are generated, and DTMF decoder circuit 92 will detect valid digits. Microprocessor 72 reads this decoding and passes it to main processor 30. After the first digit, dial tone generator circuit 78 is connected and "silence" circuit 88 is connected to the subscriber line.

When main processor 30 determines it has enough digits to determine how to route the desired call, processor 30 sends an on-hook command to microprocessor 72, which in turn deactivates relay off-hook circuit 52.

400 milliseconds later, processor 30 tells microprocessor 72 to go back off-hook, and microprocessor 72 activates the off-hook relay circuit 52 (which is in effect a "flash" signal). The "flash" signal provides a technique for communicating with the PBX equipment.

Main processor 30 sends a command to microprocessor 72 to wait for dial tone. Microprocessor 72 scans dial tone circuit 94 waiting for two samples of tone present.

When dial tone is detected by detector circuit 94, microprocessor 72 sends a code back to main processor 30 telling it that tone has in fact been detected.

Main processor 30 sends a command to microprocessor 72 to "outpulse" (turn DTMF tones on and off) a trunk access code.

Main processor 30 then sends a command to microprocessor 72 to wait for the dial tone from the trunk, and when microprocessor 72 detects dial tone it tells main processor 30 of this event.

Main processor 30 then tells microprocessor 72 to "outpulse" the rest of the digits.

After the last digit is outpulsed, main processor 30 tells microprocessor 72 to go on-hook, and microprocessor 72 then sets relay off-hook circuit 52 on-hook, thereby disconnecting line interface unit 20 from the call request loop. The caller's desired number is handled thereon by PBX circuit 14.

In order to illustrate in more detail the second embodiment of the present invention, a typical call sequence will be described in conjunction with the system depicted in FIGS. 1 and 2.

First assume an incoming external trunk 16 of FIG. 1 rings-in to the PBX 14 and is directed by the PBX to ring one of the group of subscriber lines 12 of FIG. 1 connected to the line interface 20 of the present invention.

The PBX 14 of FIG. 1 would then apply ring voltage to line interface unit 20. Ring detect circuit 58 of FIG.

2 would detect the ring voltage. Microprocessor 72 scans ring detect circuit 58, and after detecting the ring signal (for typically two samples), microprocessor 72 sends a code via bus 28 to main processor 30 of FIG. 1 telling processor 30 that the channel is being rung.

Main processor 30 sends a command to microprocessor 72 of FIG. 2 through bus 28 telling microprocessor 72 to activate on off-hook relay 52.

Microprocessor 72, in response to this command, activates relay circuit 52 thereby answering the "call."

Main processor 30 sends a command to microprocessor 72, telling it to connect the Voice Response Unit—TALKER 22. Microprocessor 72 sets MUX 86 to connect to one of the buses 24 to the Voice Response Unit—TALKER 22. Main processor 30 sends a command to the TALKER to play a certain message which instructs the caller to enter an extension number.

The trunk has now received the prompt and begins to "dial" the desired extension number. With a pushbutton type telephone subscriber set which generates DTMF (dual tone multifrequency), the caller signals the extension to be called. The DTMF decode circuit 92 will detect valid digits. Microprocessor 72 reads this decoding and passes it to main processor 30. After the first digit, the MUX 86 is connected to SILENCE 88, and the TALKER is told to stop speaking (if it has not already).

When the main processor 30 determines it has enough digits to determine the extension number to be called, processor 30 sends an on-hook command to microprocessor 72, which in turn deactivates relay on off-hook circuit 52. 400 milliseconds later, processor 30 tells microprocessor 72 to go back off-hook, and microprocessor 72 activates the on off-hook relay circuit 52 (which is in effect a "flash" signal). The "flash" signal provides a technique for communicating with the PBX equipment.

Main processor 30 sends a command to microprocessor 72 to wait for dial tone. Microprocessor 72 scans dial tone circuit 94 wiating for tone on or tone off indication.

When a tone on or off is detected, microprocessor 72 sends a code back to main processor 30 telling it. Main processor 30 waits for tone to be on for a minimum of 500 milliseconds to be sure it is dial tone.

Main processor 30 sends a command to microprocessor 72 to "outpulse" (turn DTMF tones on and off) the extension number digits. To do this, microprocessor 30 connects MUX 86 to DTMF generator A 74 or B 76 (whichever is available) and enables the generator to turn on the tones for the digit to be sent. It leaves the tones on for 100 milliseconds and then connects MUX 86 to SILENCE 88 for 100 milliseconds. It repeats this process for each digit to be "outpulsed." When all digits have been outpulsed, microprocessor 72 signals to main processor 30.

Main processor 30 then sends a command to microprocessor 72 to wait for tone events which will be generated by the busy, ring-back or answer of the called extension. Microprocessor 72 scans Tone Detect 94 for tone-on or tone-off detection. As the microprocessor 72 detects tone-on or tone-off events, it informs microprocessor 30.

Main processor 30 then analyzes the timing of the tone on and off events to determine if the extension is busy, ringing or answered.

If main processor 30 determines the called extension answered, it sends a command to microprocessor 72 to go on-hook, and microprocessor 72 then sets relay on off-hook circuit 52 on-hook, thereby disconnecting line interface unit 20 from the call request loop. The trunk is then connected to the called extension.

If main processor 30 determines that the called extension is busy, or if it does not answer after a predetermined number of ring cycles, it sends appropriate commands to microprocessor 72 to "flash" (as before) and reconnect to the trunk.

Main processor 30 then connects MUX 86 to one of the Voice Response Unit—TALKER 22 outputs (whichever is available), and sends a command to the TALKER to play a prompt informing the caller of the called extension status and instruct to wait, to leave a message or dial another extension.

Main processor 30 then waits five seconds for microprocessor 72 to tell it if another DTMF digit is received. If none is received, main processor 30 sends a command to microprocessor 72 to set MUX 87 to connect DTMF generator A 74 or DTMF generator B 76 (whichever is available) to the Voice Message Switching Unit 96 and to DTMF signal (as before), the command to start recording and the extension number to record for. Main processor 30 sends commands to microprocessor 72 to set MUX 87 to the output of filter 90 to permit the recording of the message.

Microprocessor 72 is scanning for tone events (which will be generated by the voice being recorded), and if none are received for eight seconds, main processor 30 will disconnect from the message system.

Microprocessor 72 is also scanning DTMF Decoder 92 for valid DTMF digits (while recording). If a valid DTMF digit is detected, main processor 30 is informed, and it will stop the recording processor and start processing for another extension to be called.

Two preferred embodiments of the PBX telephone call control system has been shown and described. As will be clear to those skilled in the art, variations of the system would come within the scope of the accompanying claims.

For example, the call control system provides call routing requests from internal extensions to external trunks, and from external trunks to internal extensions. The system also would provide additional call routing access such as from external trunks to other external trunks.

Likewise, the call control system would provide additional call routing for internal extensions calling other internal extensions and leaving a voice message if the called extension is busy or does not answer.

Other aspects of the improved call control system would include voice recognition for the extension to be called, other voice prompts regarding the status of the station (e.g., out to lunch, on vacation, etc.), and interface to other voice recording devices.

Another aspect of the improved call control system would be the inclusion of programming used to implement the call control system into the programming-/hardware of a voice message, voice store and forward system, or the PBX itself to provide the users of such systems the enhanced capabilities provided by the invention (e.g., caller attempts to make a call to a specific extension and leaves a recorded message on ring, no answer or busy, or a caller listens to a message and then directly calls the person who left the message or directly calls another extension on the PBX).

The overall system described above provides an improved PBX telephone call control system which adds additional features to existing PBX equipment, yet looks like any other extension to the rest of the system, while providing the necessary control of telephone call routing requests.

It is therefore intended that the scope of the present invention shall be limited only by the accompanying claims and any logical equivalents thereof.

What is claimed is:

1. A call control system for being coupled to a PBX-type exchange (hereinafter said PBX) in order to control the routing of telephone calls from one or more calling parties through said PBX between a plurality of incoming external trunks and a plurality of internal telephone subscriber lines connected to internal telephones, comprising
   a line interface unit connected to some of said internal subscriber lines for simulating a plurality of telephone extensions which can be called by said one or more calling parties through said incoming external trunks or through said internal telephones connected to others of said internal telephone subscriber lines to provide a multiple cell processing capability, said line interface unit including
   means for detecting that a calling party using one of said incoming external trunks or said internal telephones is calling one of said plurality of simulated extensions,
   means for answering said calling party on one of said incoming external trunks or said internal telephones and informing said calling party to signal a certain extension number corresponding to one of said internal telephones connected to one of said internal telephone subscriber lines,
   DTMF means responsive to a signaled extension number for receiving and decoding said signaled extension number from said calling party, and
   means for signaling said PBX to attempt a transfer of said caling party to said extension having said certain number.

2. A call control system as in claim 1 further including
   means for determining if the telephone connected to sasid subscriber line corresponding to said signaled extension number is busy, and
   means for informing said calling party said signaled certain extension number is busy.

3. A call control system as in claim 1 further including
   means for determining if said signaled telephone extension connected to said subscriber line corresponding to said signaled extension number does answer, and
   means for informing said calling party if said signaled certain extension number does not answer.

4. A call control system as in claim 1 further including means for completing said transfer.

5. A call control system as in claim 2 further including means for informing said calling party to signal another extension number.

6. A call control system as in claim 2 further including means for informing said calling party to leave a recorded voice message for said certain extension number.

7. In a call control system for being coupled to a PBX-type exchange (hereinafter said PBX) in order to control the routing of telephone calls from one or more calling parties through said PBX between a plurality of incoming external trunks and a plurality of internal telephone subscriber lines, said system including
   a line interface unit connected to some of said PBX subscriber lines for simulating a plurality of telephone extensions which can be called by said one or more calling parties through said incoming external trunks or through said internal telephones connected to others of said internal telephone subscriber lines to provide a multiple call processing capability, the method comprising the steps of
   detecting that a calling party using one of said incoming external trunks or said internal telephones is calling one of said simulated extensions,
   answering the call and informing said calling party to signal a certain extension number corresponding to one of said internal telephones connected to one of said PBX internal telephone subscriber lines,
   receiving and decoding said signaled extension number from said calling party, and
   signaling said PBX to attempt a transfer of said calling party to said certain extension number.

8. A call control system to control the routing of telephone calls from calling parties outside of a PBX-type exchange (hereinafter said PBX) coming via a plurality of incoming external trunks to access a plurality of internal telephone subscriber lines comprising
   a line interface unit connected to some of said internal subscriber lines for simultating a plurality of telephone extensions which can be called by one or more of said calling parties through telephones associated with said internal telephone lines connected to others of said internal telephone subscriber lines to provide a multiple call processing capability, said line interface unit including
   means for detecting that a telephone call is coming from a calling party on one of said incoming external trunks,
   means for answering said calling party on said incoming external trunk,
   means for giving voice instructions to said calling party to inform said calling party to signal a certain extension number corresponding to a telephone station connected to any one said PBX internal telephone subscriber lines,
   means responsive to a signaled extension number for decoding said signaled extension number from said calling party,
   means for signaling said PBX to attempt a transfer of said calling party to said certain extension number, and
   means for signaling said PBX to attempt to ring the telephone station connected to the subscriber line corresponding to said signaled certain extension number.

9. A call control system as in claim 8 further including
   means for determining if the telephone extension connected to the subscriber line corresponding to said signaled certain extension number is busy, and
   means for informing said calling party if said signaled certain extension number is busy.

10. A call control system as in claim 8 further including
    means for determining if the telephone connected to said subscriber line corresponding to said signaled certain extension number does answer, and
    means for informing said calling party if said signaled certain extension number does not answer.

11. A call control system as in claim 8 further including means for connecting said calling party on one of said external trunks to said telephone station having said certain extension number.

12. A call control system as in claim 9 further including means for informing said calling party to signal another extension number.

13. A call control system as in claim 9 further including means for informing said calling party to leave a recorded voice message for said called extension having said certain number.

* * * * *